(12) United States Patent
Brown et al.

(10) Patent No.: US 6,367,239 B1
(45) Date of Patent: Apr. 9, 2002

(54) FUEL DELIVERY SYSTEMS AND METHOD

(75) Inventors: Curtis L. Brown; Douglas M. Fortuna, both of Cincinnati; Gilbert H. Badeer, Loveland, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/207,952

(22) Filed: Dec. 9, 1998

(51) Int. Cl.[7] ............................... F02C 3/30; F02C 7/22
(52) U.S. Cl. ...................... 60/39.05; 60/39.55; 60/742; 60/39.463
(58) Field of Search .................. 60/737, 742, 39.05, 60/39.55, 39.463, 39.094; 431/163, 181

(56) References Cited

U.S. PATENT DOCUMENTS

| | | | |
|---|---|---|---|
| 3,762,650 A | * 10/1973 | Hussey et al. | ............ 60/39.463 |
| 4,977,740 A | * 12/1990 | Madden et al. | ............ 60/39.55 |
| 5,351,477 A | 10/1994 | Joshi et al. | |
| 5,511,375 A | 4/1996 | Joshi et al. | |
| 5,816,049 A | 10/1998 | Joshi | |
| 5,865,024 A | 2/1999 | Kress et al. | |

* cited by examiner

Primary Examiner—Ted Kim
(74) Attorney, Agent, or Firm—Andrew C. Hess; Rodney M. Young; Armstrong Teasdale LLP

(57) ABSTRACT

A fuel delivery system and method for operating a dual fuel and steam turbine engine that utilizes gas fuel at the engine start phase through a combination of gas and liquid fuel circuits. Gas fuel initially flows through the liquid fuel circuits to a dual fuel and steam nozzle. A boiler connected to the system generates steam, and the steam is supplied to the nozzle to raise the fuel pressure to an acceptable range. The gas fuel is injected into both the liquid and gas fuel circuits and the engine can then operate on either gas or liquid fuel, or any combination thereof.

20 Claims, 2 Drawing Sheets

US 6,367,239 B1

FUEL DELIVERY SYSTEMS AND METHOD

BACKGROUND OF THE INVENTION

This invention relates generally to turbine engines and, more particularly, to fuel systems for turbine engines.

Dual fuel turbine engines typically utilize a gas and a liquid fuel, along with steam, during engine operation. Premix gas fuel and steam nozzles are configured such that under maximum fuel flow conditions, where product requirements are met, the fuel pressure within the fuel nozzle is within an acceptable range. The fuel pressure within the fuel nozzle sometimes is referred to herein as the fuel nozzle pressure.

Setting the fuel nozzle so that the fuel will have an acceptable pressure during maximum fuel flow conditions can cause engine flame outs at engine start conditions. That is, the flame necessary for fuel combustion dies out due to an unacceptably low fuel nozzle pressure at the fuel nozzle tip during relatively low fuel flow rates.

Dual fuel engines configured with gas and liquid fuels, and steam, customarily exhibit reduced operation performance during normal engine start and low power conditions. Specifically, undesirable flame outs may occur, even under steady state fuel flow conditions, if there is a relatively low pressure ratio at the fuel nozzle tip while operating primarily on gas fuel. Unfortunately, raising the fuel nozzle pressure during engine start conditions can cause operational problems at the maximum fuel flow end where the engine operates most of the time.

Accordingly, it would be desirable to improve the functionality of a dual fuel engine during normal engine start and operating conditions. Additionally, it would be desirable if the improved functionality during engine start did not adversely affect the operation of the engine during maximum fuel flow conditions.

BRIEF SUMMARY OF THE INVENTION

These and other objects may be attained by a fuel delivery system and methods for delivering fuel to a dual fuel turbine engine which is configured to start and operate, at least partially, on gas fuel. The fuel delivery system includes at least one gas fuel circuit configured to deliver gas fuel, at least one liquid fuel circuit configured to deliver liquid fuel, a steam circuit configured to deliver steam, and a dual fuel nozzle. The dual fuel nozzle includes a plurality of fuel inlets, a steam inlet, a fuel and steam premix chamber, and a fuel nozzle tip.

More specifically, the fuel delivery system has at least one connecting line that connects the gas fuel circuit to the liquid fuel circuit. The connecting line is in flow communication with the gas fuel circuit and the liquid fuel circuit. During initial operation of the engine at least a portion of the gas fuel is diverted from the gas fuel circuit to at least one liquid fuel circuit to increase fuel pressure at the fuel nozzle tip during normal engine start and operation conditions.

Once the engine has operated a sufficient length of time, a boiler generates steam that is utilized to raise the fuel nozzle pressure above the combustor flammability deficiency range. The flow of gas fuel is diverted from the liquid fuel circuit to the gas fuel circuit and into the nozzle. The gas fuel purge is cleared from the liquid fuel circuit and liquid fuel is then supplied through the liquid fuel circuit.

The combined use of liquid and gas fuel circuits allows operation of the turbine engine even when steam is not available. The system can operate under steady state fuel flow conditions at relatively low pressure, and under maximum flow conditions, where the engine operates most of the time.

DETAILED DESCRIPTION OF THE INVENTION

Figure 1:
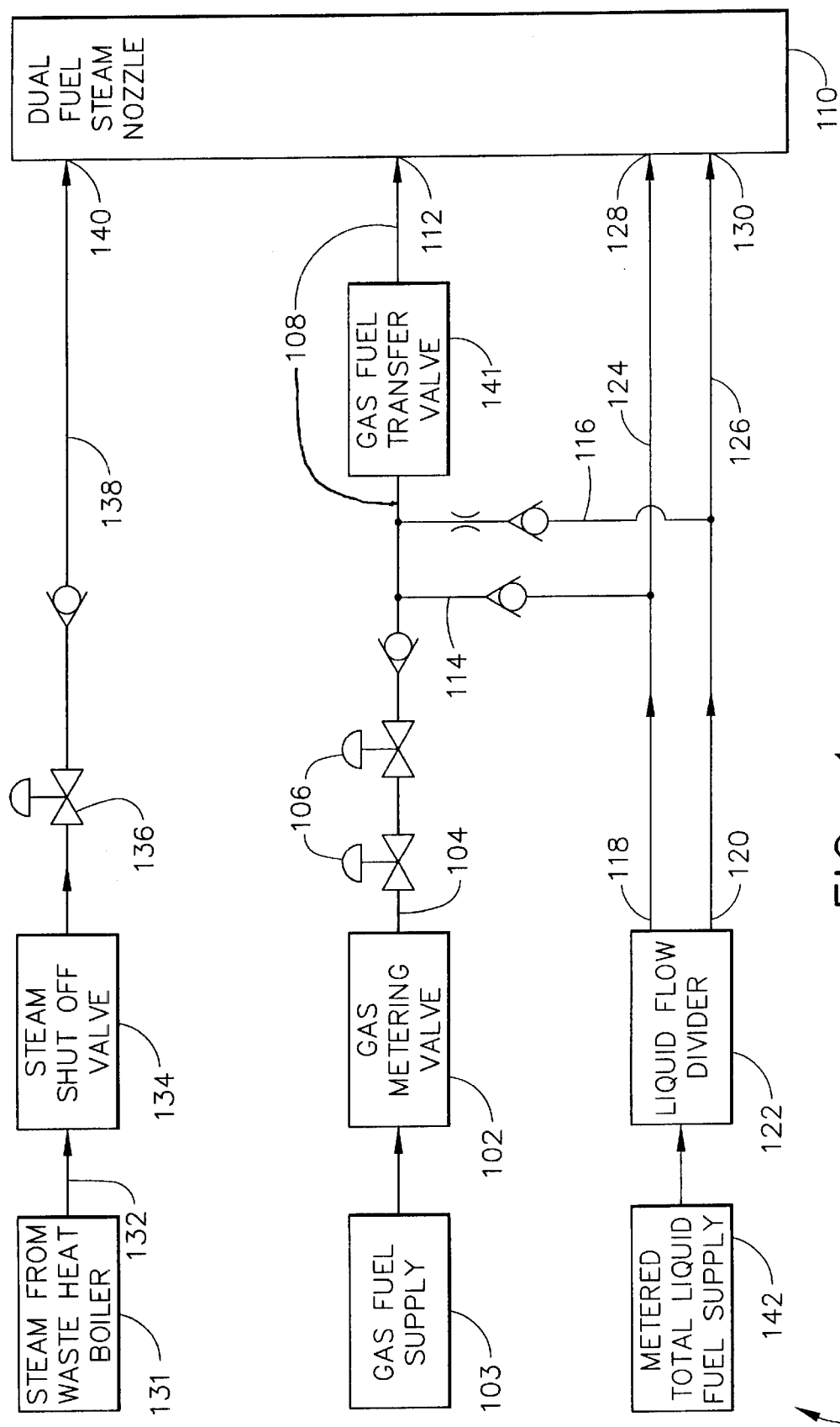
FIG. 1 is a schematic illustration of a fuel delivery system.

FIG. 1 illustrates a fuel delivery system 100 for a turbine engine (not shown) that includes a combustor (not shown). During a start phase of the engine, fuel delivery system 100 utilizes a gas metering valve 102 to allow a measured amount of gas fuel 103 to enter a gas fuel circuit 104 for use in the combustor. Gas fuel circuit 104 includes at least one gas shutoff valve 106, and at least one gas fuel line 108. A nozzle 110 includes a gas fuel inlet 112 in fluid flow communication with gas fuel circuit 104. In one embodiment, nozzle 110 is a dual fuel and steam nozzle.

Fuel delivery system 100 further includes a first connecting line 114 and a second connecting line 116 in fluid flow communication with gas fuel circuit 104. First connecting line 114 is also in fluid flow communication with a primary liquid fuel circuit 118 and second connecting line 116 is also in fluid flow communication with a secondary liquid fuel circuit 120. Gas fuel may be diverted from gas fuel circuit 104 to either primary liquid fuel circuit 118, secondary liquid fuel circuit 120, or both, during normal engine start and operation conditions.

Liquid fuel is supplied to primary liquid fuel circuit 118 and secondary liquid fuel circuit 120 through a liquid flow divider 122. Primary liquid fuel circuit 118 includes at least one first liquid fuel line, primary liquid fuel line 124 and secondary liquid fuel circuit 120 includes at least one second liquid fuel line, secondary liquid fuel line 126. Nozzle 110 includes a liquid fuel primary inlet 128 and a liquid fuel secondary inlet 130 that are in fluid flow communication with primary liquid fuel circuit 118 and secondary liquid fuel circuit 120, respectively.

Steam 131 is generated and supplied to fuel delivery system 100 through a steam circuit 132. Steam circuit 132 includes a steam shut off valve 134, a steam metering valve 136, and a steam line 138. Nozzle 110 includes a steam inlet 140 that is in fluid flow communication with steam circuit 132.

At engine start, gas fuel is diverted from gas fuel line 108 to primary liquid fuel line 124 through first connecting line 114. Gas fuel may also be diverted from gas fuel line 108 to secondary liquid fuel line 126 through second connecting line 116. A gas fuel transfer valve 141 directs gas fuel to first connecting line 114 and second connecting line 116. For example, when gas fuel transfer valve 141 is open, gas fuel flows primarily through gas fuel line 108, and when gas fuel transfer valve 141 is closed, gas fuel flows primarily through fuel lines 124 and 126.

Fuel delivery system 100 utilizes a metered total liquid fuel supply 142 connected to liquid flow divider 122 to supply liquid fuel to the turbine combustor. Given that the engine must be capable of starting on gas fuel, the total metered amount of gas fuel is injected into the combustor, at the start of the engine, through primary liquid fuel circuit 118, secondary liquid fuel circuit 120, gas fuel circuit 104, or some combination of circuits.

The total metered amount of gas is injected into the engine, combustion occurs, and an engine flame and heat are generated. In one embodiment, the requisite initial fuel pressure is generated by gas fuel supplied to the combustor through a combination of liquid fuel primary inlet 128 and liquid fuel secondary inlet 130. Liquid fuel inlets 128 and 130 are smaller than gas inlet 112 which allows the gas fuel to be supplied at a higher pressure than if it were supplied solely through gas fuel inlet 112.

The engine includes a boiler (not shown) that generates steam. The boiler is in fluid flow communication with steam circuit 132. Steam flows through steam circuit 132 and raises the fuel pressure within nozzle 110. When the steam pressure reaches a predetermined value, the gas fuel is purged from primary liquid fuel line 124 and secondary liquid fuel line 126, and diverted back to gas line 108 where it enters nozzle 110 through gas inlet 112. Gas fuel then flows at a minimum flow level (purge) through first connecting line 114 and second connecting line 116.

Liquid fuel is supplied through liquid flow divider 122 to primary liquid fuel circuit 118 and secondary liquid fuel circuit 120. Liquid and gas fuel, in combination with steam, are supplied to the combustor. The pressure of the gas fuel and steam mixture through the nozzle is sufficient to prevent flame outs during operation of the engine. The engine can be operated through gas and liquid fuel circuits or some combination when steam is not available to raise fuel nozzle pressure.

Figure 2:
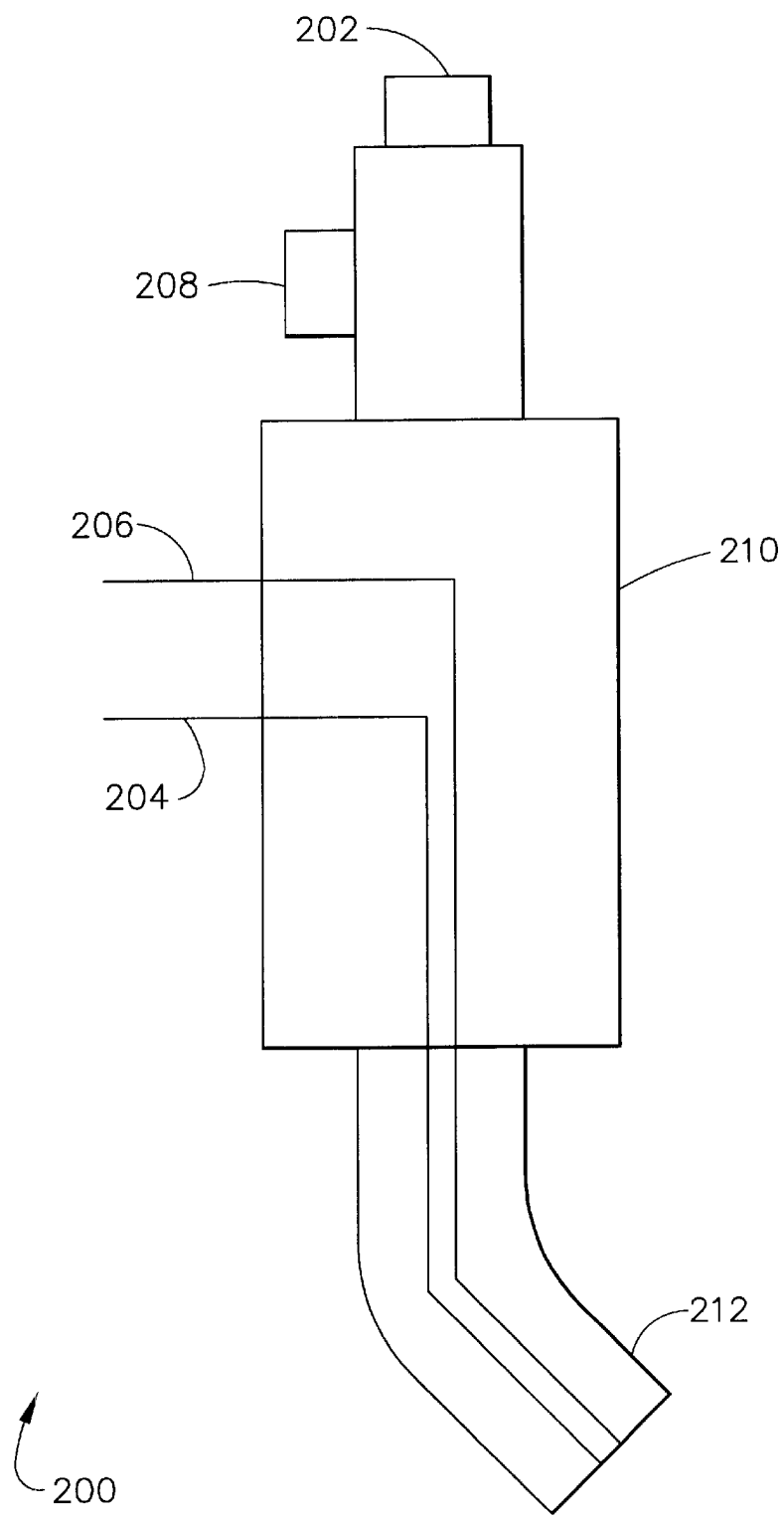
FIG. 2 is a cross section view of a dual fuel and steam nozzle.

FIG. 2 illustrates one embodiment of a dual fuel and steam nozzle 200. Nozzle 200 could be used, for example, in connection with system 100 (i.e., as nozzle 110). Nozzle 200 includes a gas fuel inlet 202, a liquid fuel primary inlet 204, and a liquid fuel secondary inlet 206. Gas fuel inlet 202 is larger than liquid fuel primary inlet 204 and liquid fuel secondary inlet 206. The reduced size of liquid fuel inlets 204 and 206 increases the pressure of the gas fuel as it flows through inlets 204 and 206. The increased pressure allows the engine to initially operate on gas fuel while reducing the probability of engine flame out due to unacceptable pressure through the fuel nozzle at low fuel flow rates.

Nozzle 200 also includes a steam inlet 208, a premix chamber 210 and a fuel nozzle tip 212. In one embodiment, premix chamber 210 is unitary with and common to inlets 202 and 208. Nozzle 200 is fabricated from an inconel alloy.

Gas fuel normally flows through gas fuel inlet 202. However, operation limitations can be exhibited in a dual fuel and steam turbine engine during a normal engine start sequence or during low operating ranges. In one embodiment, during initial engine operation gas fuel flows through liquid fuel primary inlet 204 and liquid fuel secondary inlet 206.

Also, the turbine engine includes a boiler that generates steam during engine operation. Once steam is generated, it flows through steam inlet 208 and enters fuel and steam premix chamber 210. The steam raises the fuel pressure to an acceptable range in nozzle 200 at fuel nozzle tip 212. Gas fuel is then directed back to gas fuel inlet 202 and liquid fuel flows through liquid fuel primary inlet 204 and liquid fuel secondary inlet 206 for purge.

The fuel delivery system utilizes the existing turbine engine fuel and steam circuits to initially operate the turbine engine. In one embodiment, the gas fuel is routed from the gas fuel line to a combination of liquid fuel lines to achieve initial fuel pressure and operate the turbine engine until steam is generated. As a result, the gas fuel can be diverted back to the gas fuel line and the turbine engine can be operated through gas and liquid fuel circuits or some combination should steam not be available to raise fuel nozzle pressure.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A fuel delivery system for a turbine engine, said fuel delivery system comprising at least one fuel line configured to deliver to the turbine engine a first fuel during initial operation of the engine and a second fuel once the engine has operated a predetermined length of time, a fuel nozzle in flow communication with said fuel line, and including a common premix portion in flow communication with at least one steam circuit and at least one gaseous fuel circuit coupled in flow communication with a plurality of liquid fuel circuits, such that steam and gaseous fuel entering said fuel nozzle are premixed, said steam circuit comprising a steam line comprising at least one of a shut off valve and a metering valve, said steam line configured to supply steam to the turbine engine through said fuel nozzle.

2. A fuel delivery system in accordance with claim 1 wherein said fuel nozzle includes a plurality of fuel inlets.

3. A fuel delivery system in accordance with claim 2 wherein said plurality of fuel inlets comprises a gas fuel inlet and at least one liquid fuel inlet.

4. A fuel delivery system in accordance with claim 3 wherein said gas fuel inlet is larger than said at least one liquid fuel inlet said gaseous fuel circuit comprises at least one gas fuel line connected to said gas fuel inlet.

5. A fuel delivery system in accordance with claim 4 wherein:

said at least one liquid fuel inlet comprises a first liquid fuel inlet and a second liquid fuel inlet, said plurality of liquid fuel circuits comprising a first liquid fuel line connected to said first liquid fuel inlet, and a second liquid fuel line connected to said second liquid fuel inlet; and said gas fuel line is larger than said first liquid fuel line and said second liquid fuel line.

6. A fuel delivery system in accordance with claim 5 further comprising:

a first connecting line connecting said gas fuel line to said first liquid fuel line, and a second connecting line connecting said gas fuel line to said second liquid fuel line; and a boiler in flow communication with said steam line, said fuel nozzle further including a steam inlet, said steam line configured to supply steam through said steam inlet to said fuel nozzle common premix portion.

7. A fuel delivery system in accordance with claim 6 wherein said system is configured to:

direct gas fuel to said first and second liquid fuel lines through said first and second connecting lines, respectively, during operation of the engine; and supply gas fuel through said gas fuel inlet to said common premix portion after a predetermined pressure has built up within said common premix portion.

8. A fuel delivery system in accordance with claim 7 wherein said system is configured to:

direct gas fuel from said first and second liquid fuel lines through said first and second connecting lines, to said gas fuel line; and direct liquid fuel to said first and second liquid fuel lines once the engine has operated a predetermined length of time.

9. A method for delivering fuel through a fuel delivery system to a combustor of a turbine engine, the fuel delivery system including a fuel nozzle, a gaseous fuel circuit, a steam circuit, and a plurality of liquid fuel circuits, the fuel nozzle including a gas fuel inlet, a first liquid fuel inlet, a second liquid fuel inlet, and a steam inlet, the gaseous fuel circuit including a gas fuel line connected to the gas fuel inlet, the plurality of liquid fuel circuits including a first liquid fuel line and a second liquid fuel line connected to the first and second liquid fuel inlets, respectively, a first connecting line connecting the gas fuel line to the first liquid fuel line, and a second connecting line connecting the gas fuel line to the second liquid fuel line, the steam circuit including a steam line connected to the steam inlet and including a steam shut off valve and a metering valve, said method comprising the steps of:

supplying gas through the gas fuel line into a premix chamber formed within the fuel nozzle and in flow communication with the gaseous fuel circuit and a steam circuit, wherein the gaseous fuel circuit is in flow communication with the plurality of liquid fuel circuits; and directing the gas from the gas fuel line to at least one of the connecting lines, through at least one of the liquid fuel lines, and through at least one of the liquid fuel inlets to the fuel nozzle during operation of the engine.

10. A method in accordance with claim 9 wherein said step of directing the gas includes the steps of:

directing the gas through the first connecting line, the first liquid fuel line and the first liquid fuel inlet; and directing the gas through the second connecting line, the second liquid fuel line, and the second liquid fuel inlet.

11. A method in accordance with claim 10 further comprising the steps of:

supplying steam through the steam line and through the steam inlet;

increasing the pressure through the premix chamber by supplying steam to the premix chamber;

determining when a predetermined amount of pressure has built up within the premix chamber;

supplying gas to the premix chamber through the gas fuel line and the gas fuel inlet;

minimizing the flow of gas fuel through the first connecting line and the second connecting line;

purging the gas fuel from the liquid fuel lines; and supplying liquid fuel through the liquid fuel lines, and through the liquid fuel inlets to the fuel nozzle tip.

12. A method in accordance with claim 9 wherein said step of directing the gas further comprises the steps of:

directing a portion of the gas from the gas fuel line to the first connecting line, through the first liquid fuel line, and through the first liquid fuel inlet to the fuel nozzle tip; and supplying liquid fuel through the second liquid fuel line, and through the second liquid fuel inlet to the fuel nozzle tip.

13. A method in accordance with claim 9 wherein said step of directing the gas further comprises the steps of:

directing a portion of the gas from the gas fuel line to the first connecting line, through the first liquid fuel line, and through the first liquid fuel inlet to the fuel nozzle tip during operation of the engine; and directing a portion of the gas from the gas fuel line to the second connecting line, through the second liquid fuel line, and through the second liquid fuel inlet to the fuel nozzle tip during operation of the engine.

14. A method in accordance with claim 11 wherein the premix chamber is common to the gas fuel inlet and the steam inlet.

15. An apparatus for delivering fuel to a turbine engine, said apparatus comprising:

a fuel nozzle comprising a plurality of inlets having a common premix chamber formed within said fuel nozzle;

a gaseous fuel circuit comprising at least one fuel line configured to deliver fuel through at least one of said fuel nozzle inlets into said premix chamber, said gaseous fuel circuit in flow communication with a plurality of liquid fuel circuits;

a steam circuit comprising at least one steam line connected in flow communication with at least one of said fuel nozzle inlets and said premix chamber, said steam line comprising a steam metering valve, and a shut off valve; and a boiler coupled in flow communication with said steam line and configured to supply steam through said steam line to said premix chamber.

16. An apparatus in accordance with claim 15 wherein said at least one fuel line comprises a gas fuel line connected to a gas fuel metering and shut off valve.

17. An apparatus in accordance with claim 15 wherein said plurality of liquid fuel circuits comprise:

a first liquid fuel line;

a second liquid fuel line;

a first connecting line connected to said gas fuel line and to said first liquid fuel line; and a second connecting line connected to said gas fuel line and to said second liquid fuel line.

18. An apparatus in accordance with claim 17 wherein said apparatus is configured to supply gas fuel through said first liquid fuel line and said second liquid fuel line.

19. An apparatus in accordance with claim 17 wherein said apparatus is configured to supply a combination of gas and liquid fuel during operation of the engine.

20. An apparatus in accordance with claim 15 wherein said fuel nozzle comprises:

a gas fuel inlet;

a liquid fuel primary inlet, and a liquid fuel secondary inlet; and a steam inlet.

* * * * *